United States Patent [19]
Ebersbach et al.

[11] Patent Number: 5,579,246
[45] Date of Patent: Nov. 26, 1996

[54] METHOD AND DEVICE FOR THE CORRECTION OF MEASUREMENT ERRORS DUE TO VIBRATIONS IN COORDINATE MEASURING DEVICES

[75] Inventors: Peter Ebersbach, Essingen; Helmut Müller, Gmünd, both of Germany

[73] Assignee: Carl-Zeiss-Stiftung, Heidenheim, Germany

[21] Appl. No.: 353,595

[22] Filed: Dec. 12, 1994

[30] Foreign Application Priority Data

Dec. 11, 1993 [DE] Germany ............... 43 42 312.4

[51] Int. Cl.[6] ............... G01B 5/008; G01B 7/008
[52] U.S. Cl. ............... 364/571.01; 33/503; 33/504; 364/560; 364/571.02; 364/571.04
[58] Field of Search ............... 33/503, 504; 364/559, 364/560, 571.01, 571.02, 571.04

[56] References Cited

U.S. PATENT DOCUMENTS

| | | | |
|---|---|---|---|
| 3,165,834 | 1/1965 | Benton | 33/503 X |
| 3,206,857 | 9/1965 | Kaye | 33/503 |
| 3,384,970 | 5/1968 | Avalear | 33/503 |
| 3,509,635 | 5/1970 | Meinke | 33/503 X |
| 3,754,487 | 8/1973 | Nachtigal | 82/1.11 |
| 4,333,238 | 6/1982 | McMurtry | 33/504 |
| 4,782,598 | 11/1988 | Guarini | 33/503 |
| 5,420,804 | 5/1995 | Tanaka et al. | 364/571.01 |

FOREIGN PATENT DOCUMENTS 4035923  5/1992  Germany .

*Primary Examiner*—Edward R. Cosimano

[57] ABSTRACT

For the correction of measurement errors, due to vibration, of coordinate measuring devices, the time course of the interfering vibrations is stored by means of sensors ($a_x$, $a_y$, $a_z$) on a vibrating portion of the coordinate measuring device. The measured values of the sensors are adjusted with previously determined and stored correction parameters, which describe the natural frequency (v) and the damping constants ($\delta$) of the vibrations and also the amplitude and phase information of the characteristic modes ($G_r$) of the vibrations contributing to the interfering vibrations. The measurement errors, due to vibration, of the coordinate measuring device at the instant of probing are then calculated from the time course of the corrected measurement values of the sensors ($a_x$, $a_y$, $a_z$).

17 Claims, 5 Drawing Sheets

METHOD AND DEVICE FOR THE CORRECTION OF MEASUREMENT ERRORS DUE TO VIBRATIONS IN COORDINATE MEASURING DEVICES

BACKGROUND OF THE INVENTION

1. Field of the Invention

In coordinate measuring devices, and in particular those of the so-called column type, relatively large vibrations occur in the machine structure in the course of acceleration and braking processes, and are not detected by the path measurement system, that is, with the scales of the coordinate measuring device, and hence lead to erroneous measurements. In the course of these vibrations the probe head of the coordinate measuring device is deflected from the null position given by the scales, and the position of the probe head at the moment of sensing, that is, when the probe element of the probe head contacts the workpiece, is thus not precisely defined. In column measuring devices, these vibrations occur with a large amplitude, particularly when the horizontal measuring arm or measuring beam of the device has extended fully and has traveled to the upper end of the vertical column of the device, i.e., into edge positions of the measuring region, where the machine configuration is less rigid.

2. Relevant Prior Art

It has indeed already been proposed, in U.S. Pat. No. 4,333,238, for coordinate measuring devices of the so-called portal type to detect the dynamic bending of the measuring spindle, which is vertical, of the device by means of an acceleration sensor and to correct the coordinate measurement value provided by the probe head of the device. Correction values for different places in the measurement region of the machine are selected, corresponding to the measurement values of the acceleration sensor, by means of an allocation rule which is not more closely designated.

The described system however has not heretofore been used for the correction of measurement errors due to vibrations in coordinate measuring devices, primarily because there is no simple allocation rule which can be found by calibration and with which the measurement values of the acceleration sensors can be recalculated into the associated deflection of the sensing element at the instant of the measurement. Accordingly, acceleration sensors are nowadays only used in coordinate measuring devices in order to sense the amplitude of the vibrations and to evaluate the corresponding signal for a monitoring of the obtained measured coordinate values in the sense of a Yes/No statement, "measurement valid" or "vibration amplitude too high, i.e. , measurement invalid", as for example is mentioned in DE-OS [German Laid-Open Patent Application] 4,035,923 and in the above cited U.S. Pat. No. 4,333,238.

It is known from U.S. Pat. No. 4,782,598 to permanently sense the inclination errors of the machine parts of a coordinate measuring device and, based on the known geometrical relationships between the machine parts, to calculate back to the position of the probe element. However, this process requires relatively many sensors at different places of the machine and supplies usable results only in static operation. Also here, the vibration of the machine parts is only evaluated, by means of a so-called "Vibration Filter (66)" (see U.S. Pat. No. 4,782,589, FIG. 9), in order to monitor the validity of measurement values in the sense of a Yes/No Statement.

SUMMARY OF THE INVENTION

The object of the present invention is to provide a method which makes it possible, with a few inexpensive sensors, to reliably monitor the vibration state of the probe element in a coordinate measuring device and to reliably correct the errors of the measured coordinate values which are due to interfering vibrations.

This object is achieved with the following method: the time course of interfering vibrations is continuously monitored by means of sensors on a vibrating portion of the coordinate measuring device and is stored during a time interval. The measured values of the sensors are adjusted with stored correction parameters that describe the natural frequency (v) and the damping constants ($\delta$) of the vibrations and also the amplitude and phase information of the characteristic modes ($G_r$) of the vibrations contributing to the interfering vibrations. The measurement errors of the coordinate measuring device due to vibration are calculated at the point of probing from the time course of the corrected measured values of the sensors.

A coordinate measuring device according to the method of the invention has a probe head and a device for the correction of errors, due to vibration, of the coordinate measurement. The device includes one or more sensors to monitor the time course of the interfering vibrations to which the probe head is subject and a computer that determines from the measured values of the sensors the measurement errors, due to vibration, which arise in coordinate measurements with the probe head. Associated with the computer is a memory unit in which, for different positions of the probe head in the measuring region of the coordinate measuring device, correction parameters are stored that describe the natural frequency (v) and the damping constants ($\delta$) of the of the vibrations and also the amplitude and phase information, characteristic modes ($G_r$) of the vibrations contributing to the interfering vibrations. Also, the device includes a second memory unit in which the time course of the measured values of the sensors can be stored at least temporarily.

In the method according to the invention, it is possible for the first time to acquire correction values from the signals of relatively inexpensive sensors such as, for example, acceleration sensors, with which it becomes possible to drastically reduce the measuring uncertainty of coordinate measuring devices due to vibrations in the machine structure. Thus it was possible, for example, to reduce the spread of the coordinate measurement values of an uncorrected column measuring machine, which was about 80 µm, to a spread of about 11 µm by means of the method according to the invention. Correspondingly, with a machine construction which is otherwise unchanged, it is possible to make the probe head travel faster, or to make measurements more accurately. The additional expense required to carry out the method is relatively small, since only a few inexpensive sensors, for example, three acceleration sensors, are required for the three coordinate directions in which the probe head can vibrate.

The invention is derived from the recognition that it is not possible to reliably acquire the instantaneous deflection of a vibrating machine part only from the signals which are supplied at this instant by acceleration sensors. On the contrary, it has been found that it is necessary to determine the relative phases and amplitudes of the different vibration portions which contribute to the overall vibration. These vibration portions are determined by their fundamental frequencies, damping constants and characteristic modes, and also the initial condition of the vibration. Only when these magnitudes are known can the dynamic, i.e., vibration-dependent, measurement errors of the coordinate measurement be determined as a vibrational path at the location of the probe element from the vibrational path at the location of the sensors. Since the characteristic modes, characteristic frequencies, and damping constants are dependent on the respective position of the probe head in the measurement region of the coordinate measuring device, these magnitudes which are necessary for the exact calculation of the vibration-determined measurement error are appropriately determined for different positions of the measuring slide of the coordinate measuring device, and are stored, for example, as a multidimensional data field. It is necessary for the determination of the initial conditions to record the course of the signals of the sensors at least over a certain time interval in the neighborhood of the instant of probing. From this time course, and with knowledge of the above mentioned parameter values, the instantaneous value of the vibrational amplitude can then be reliably determined from the acceleration signals of the sensors.

DESCRIPTION OF THE DRAWINGS

Further advantages of the invention will become apparent from the following description of preferred embodiments with reference to FIGS. 1–7 of the accompanying drawings, in which.

DETAILED DESCRIPTION OF PREFERRED EMBODIMENTS

Figure 1:
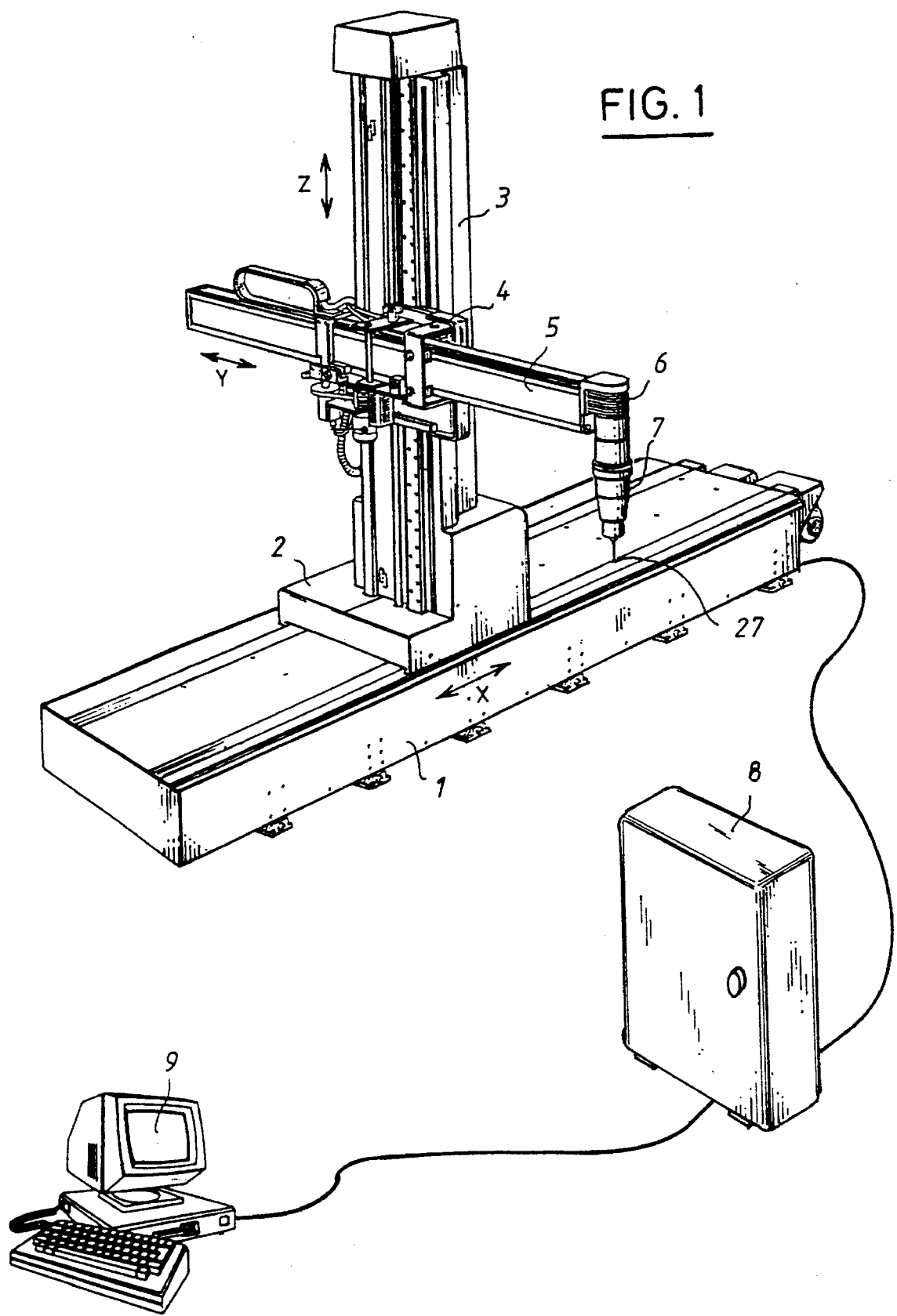
FIG. 1 is a perspective view of a coordinate measuring device of column construction.

The coordinate measuring device of column construction which is shown in FIG. 1 has a stable machine bed (1), which can, for example, even be sunk into the foundation of a manufacturing shop. The machine base (1) contains the guides for the so-called X-slide (2), which is displaceable in the direction of the arrow marked X, and which carries the vertical column (3) of the device. The so-called cross slide (4) of the measuring device is vertically displaceable in this column (3) along the arrow marked Z. The cross slide (4) contains, for its part, the bearings in which the measuring arm (5), which is constructed in the fashion of a horizontal beam, can travel along the arrow marked with Y. The probe head (7) of the coordinate measuring device is mounted at the front end of the measuring arm (5) by means of a mounting (6). The movable probe pin carries the probe ball (27), with which the workpiece, not shown in the FIG., is probed, to be measured according to coordinates.

The control cabinet of the device is denoted by (8), and contains the electronics for the drive and the measuring system, i.e., for the scales which are fitted in the individual displacement axes (X, Y, Z). The control (8) communicates via a data bus with a computer (9) of the coordinate measuring device, the measuring and evaluation software for the device being loaded on the said computer.

Coordinate measuring devices with the described construction are known per se and are, for example, offered for sale by the Applicants' assignee under the designations PSM and SMC.

Figure 2:
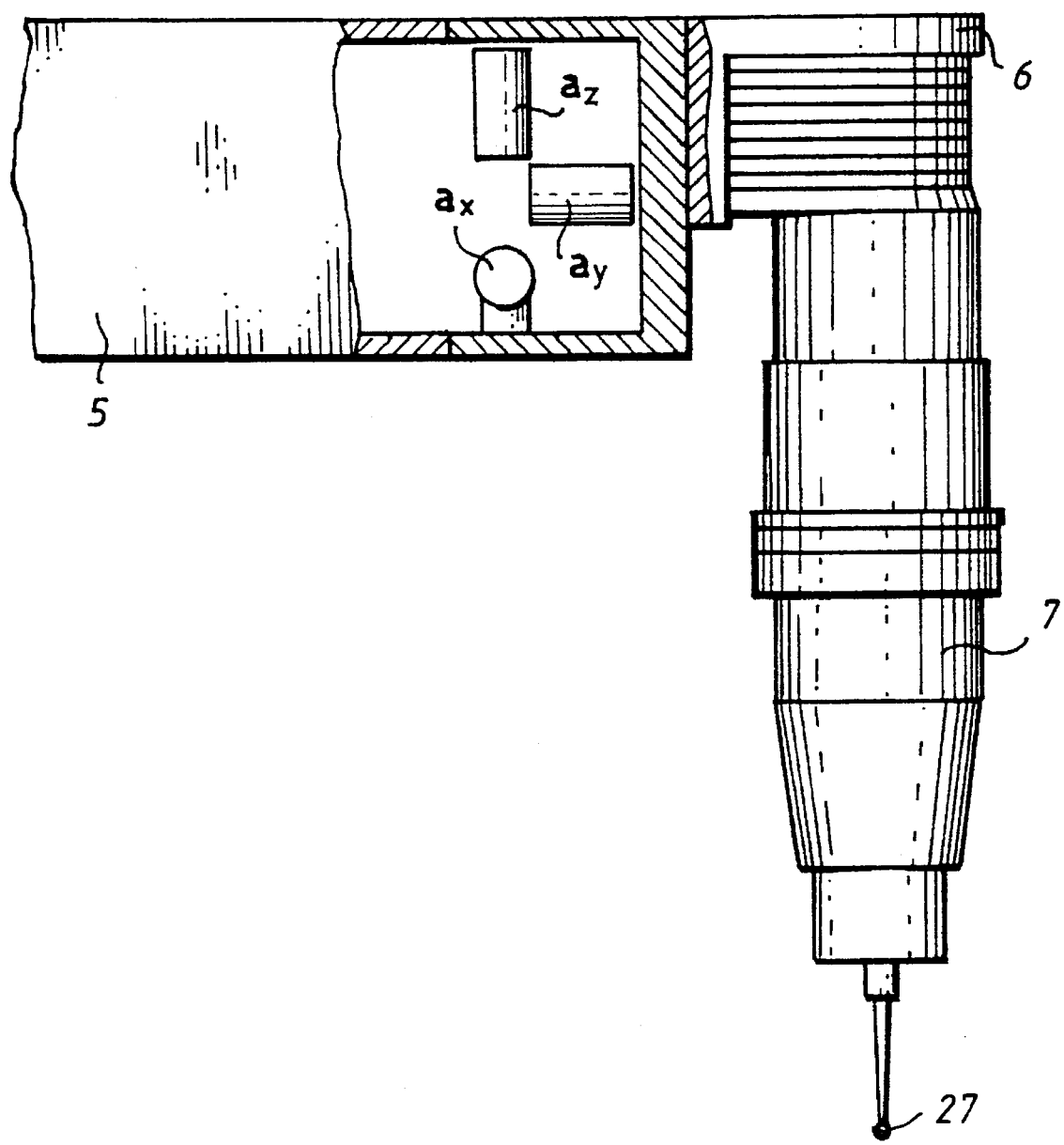
FIG. 2 shows the front end of the measuring arm with the probe head attached thereto, partially in section and at a larger scale than in FIG. 1.

According to the invention, three acceleration sensors ($a_x$, $a_y$, $a_z$) are now built into the front end of the measuring arm (5) in the immediate neighborhood of the mounting (6) for the probe head (7). Their arrangement is evident from the enlarged representation of FIG. 2. These sensors are moving coil systems, whose axes are aligned corresponding to the three spatial directions (x, y, z). The signal conductors for these sensors are laid to the control cabinet, together with the signal conductors for the probe head (7), by means of screened cables.

The sensors ($a_x$, $a_y$, $a_z$) have the function of monitoring by measurement techniques the vibrations which the measuring arm (5) undergoes when the coordinate measuring device is operated. The position of the probe head (7) at the instant of probing is indefinite to the extent of the amplitude of these vibrations when the vibration path is not suitably sensed and factored into the position measurement values supplied by the scales of the coordinate measuring device.

Vibrations of the measuring arm (5) always occur, for example, when one of the drives of the three measuring slides of the coordinate measuring device is braked from so-called "fast motion" to the constant so-called "speed of probing", at which the probe head (7) then moves toward the workpiece until contact of the probe ball (27) with the workpiece. However, the vibrations can also be excited by vibrations in the foundation, by the position regulators of the drives, and the like.

In the first mentioned case of the braking process, decaying vibrations are concerned, which consist of a superposition of decay curves of the individual natural frequencies of the machine structure. A given mode of vibration (characteristic mode) is associated with each natural frequency, and describes the way in which the structure of the coordinate measuring device deflects.

To determine the proportions in which the individual characteristic modes take part in the overall vibration, the three acceleration sensors ($a_x$, $a_y$, $a_z$) are arranged corresponding to three space directions and are fitted at a location at which there are present the largest possible vibration amplitudes for the natural frequencies which affect the coordinate measurement value or its measurement errors. The spatial arrangement of the three sensors moreover ensures that all the constituents of the vibration are monitored.

Figure 3:
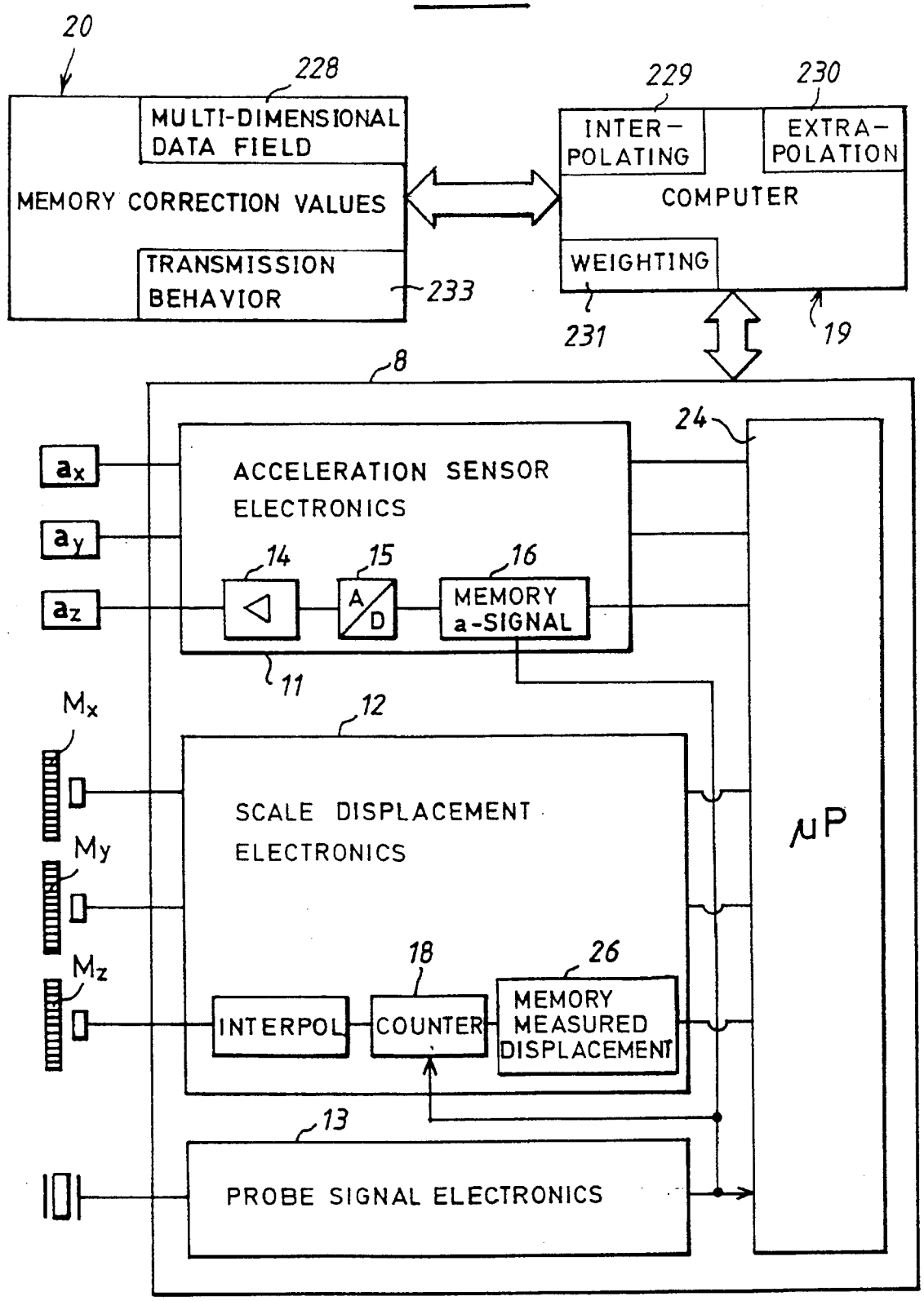
FIG. 3 is a block circuit diagram which shows the essential components of the electronics of the coordinate measuring device of FIG. 1.

As can be seen from the block circuit diagram of FIG. 3, the signals of the three sensors ($a_x$, $a_y$, $a_z$) are processed in the control (8) in parallel on a printed card (11) and are here first amplified at (14); the analog acceleration signal is then converted in the machine cycle of, for example, 5 ms to a digital signal (15) and is read into a so-called first in, first out memory (16). The signals stored in this memory that are always present extend back for a period of the last 100–200 ms, so that from their time course, as will be described in more detail below, the instantaneous value of the deflection of the probe head (7) due to vibrations can be calculated.

The control (8) likewise contains the electronics (12) with the three channels for processing the signals of the linear measurement system (scales $M_x$, $M_y$, $M_z$) of the coordinate measuring device and the electronics (13) for amplifying and further processing the signal which the probe head (7) generates at the instant of contact with the workpiece. The probe signal supplied by the electronics (13) acts, on the one hand, to freeze the counter states of the counter (18) with the measurement values of the path measuring system at the instant of probing, and to transmit them to an intermediate memory (26). The signal furthermore acts to read out the time course of the signals of the sensors ($a_x$, $a_y$, $a_z$) stored in the first in, first out memory (16) at each probing and to transmit them to the microprocessor (24), which passes these values by means of the data bus to the computer (19) where they are further processed for the correction of the path measurement values, supplied by the electronics (12), of the scales $M_x$, $M_y$, $M_z$.

Figure 4:
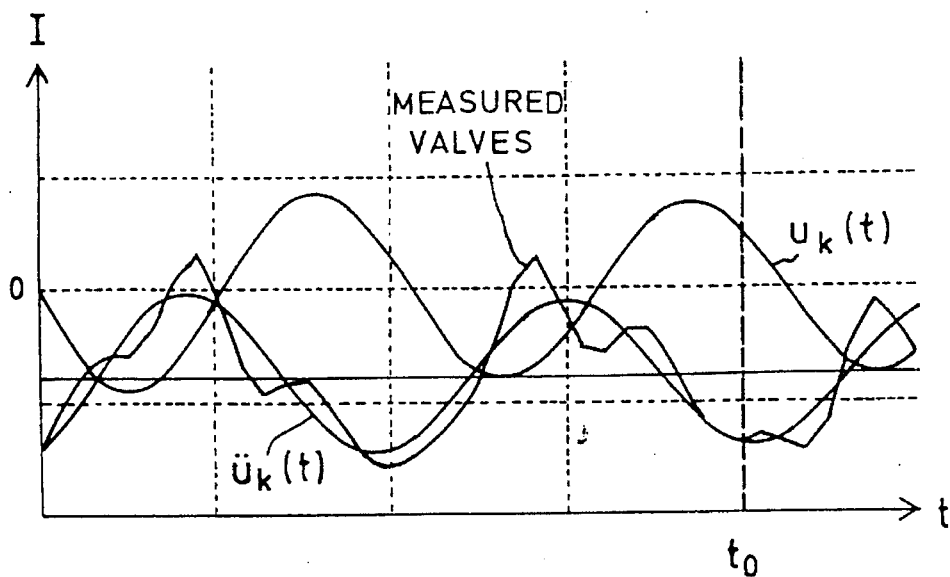
FIG. 4 is a diagram in which the time course of the signal of an acceleration sensor is shown as an example.

The time course of the signal of an acceleration sensor, e.g., $a_x$, is shown in FIG. 4 by way of example (see the curve labeled "Measured Values"). As has already been stated, it is not directly possible to determine the deflection path of the measuring arm (5) or of the probe head (7) from these acceleration values, since the measurement values are relatively strongly scattered. However, it is possible for the measurement values to be approximated by a "clean" damped periodic vibration, when the resonance frequency v and the decay constant δ, i.e., the measure of the damping of the vibration, are known. The graph $\ddot{u}_k$ (t) describes such an approximated acceleration signal, and from this, the path signal (graph $u_k$ (t)) can also be unambiguously calculated, which is what is actually required for the correction of the coordinate measurement values.

A further problem is based on the fact that the acceleration sensors ($a_x$, $a_y$, $a_z$) cannot be arranged directly at the location of the probe ball (27) of the probe head (7). To recalculate the vibration path at the location of the sensors ($a_x$, $a_y$, $a_z$) to the vibration path at the location of the probe ball (27), knowledge is required of the characteristic mode vectors of the vibration for the two locations; at least, however, the relationship of the characteristic mode values at the two locations must be known. This relationship is described by a tensor ($G_r$), i.e. a diagonal matrix for each characteristic mode of the vibration.

Now, the natural frequencies v, damping constants δ and characteristic modes r of the interfering vibrations however depend on the respective position of the probe head (7) or of the measuring slide of the coordinate measuring device in the measuring region. Hence the natural frequencies v, damping constants δ and characteristic mode dependent tensors ($G_r$) are determined once and for all for the coordinate measuring device according to FIG. 1 and are deposited in a data set in the memory (20) of the computer (19) of the coordinate measuring device.

The said parameters are measured in the following manner: the natural frequencies and damping constants are determined from decay curves by means of the so-called polyreference method, a method specific for modal analysis. Software is offered for this purpose, e.g. by the firm of SDRC (Structural Dynamics Research Corporation) and termed TDAS (Test Data Analysis). The decay curves are obtained, for example, in that the acceleration signals of the sensors ($a_x$, $a_y$, $a_z$) that arise when the coordinate measuring device is halted (brake) are recorded.

The natural frequencies and damping constants are determined at different reference places in the measuring region. For points between these reference places, the parameter can be interpolated in the subsequent correction calculation.

The characteristic mode tensors ($G_r$) could, for example, be determined by computer by means of a finite element method. However, this is very expensive, since the travel length of the measuring slide is different for each reference place and consequently different models of the machine geometry had to be calculated. It is therefore more expedient to determine the tensors by positioning the probe head (7) of the coordinate measuring device at the reference places and then harmonically exciting the machine structure at the individual natural frequencies by means of the drives. If then on the one hand the time course of the path signal of the vibration at the location of the probe head (7) is measured, e.g. with a laser interferometer, and simultaneously the acceleration signals of the sensors ($a_x$, $a_y$, $a_z$) are measured, then the required characteristic mode parameter can be directly determined from the path measurement values of the laser interferometer and the acceleration signals of the sensors.

As has been previously described the natural frequencies v of the significant interfering frequencies, their damping constants δ and the tensors ($G_r$) dependent on the characteristic modes, are stored in the form of a multidimensional data field in the memory (20) of the computer (19) for a series of reference places in the measuring region of the coordinate measuring device according to FIG. 1. Since the machine structure hardly changes on travel of the X-carriage (2) in relation to the interfering vibrations which arise, it is sufficient to take a two-dimensional data field with values of the correction parameters at reference places in the Y/Z plane.

In the calculation of the vibration amplitudes of the probe ball (27) at the instant of probing, reference is made to the stored signal course of the acceleration signals of the sensors ($a_x$, $a_y$, $a_z$), which is adjusted with the correction parameters v, δ and $G_r$=characteristic mode tensor.

Summarizing, the correction of the measuring error due to vibration with reference to the probe ball at the instant of probing runs as follows:

First, the natural frequencies v and damping constants δ which belong to the characteristic modes (r), and of which the interfering vibration is composed, are determined once and for all at different reference places in the measuring region of the coordinate measuring device. Furthermore, likewise for each reference place, the characteristic mode factors $G_r$ are determined which describe the relationship of the characteristic mode vectors at the location of the sensor or vibration pickup and at the location of the probe ball.

The parameters thus determined are stored for the subsequent correction.

During the measurement process, the time course of the signals of the vibration sensors in the neighborhood of the point of probing are stored, A "clean" damped vibration is optimally fitted to this stored signal course, using the previously measured parameters $v_r$ and $δ_r$.

This "clean" vibration, which describes, e.g., the course of the acceleration signal, is recalculated into the associated path signal or into its course over time.

This path signal is recalculated, by means of the previously determined characteristic mode factors, into an error signal at the location of the probe ball, or into its course over time.

The correction of the measuring error may further comprise storing the correction parameters as a multi-dimensional data field (228) for reference points dependent on the position of a probe head of the coordinate measuring device in its measurement volume and interpolating (at 229) the correction parameters for coordinate measurements between these reference points from correction parameters of adjacent reference points.

Correction may also comprise storing the time course of the measured values of the sensors in a rhythm of the machine cycle and determining the measurement errors due to vibration of the coordinate measurement by means of extrapolation (at 230) to the exact instant of probing, at which a probe element on a probe head (7, 107) of the coordinate measurement device contacts a workpiece to be measured.

The correction may also comprise weighting (at 231) the stored measured values of the sensors ($a_x$, $a_y$, $a_z$) differently in calculating the measurement errors of the coordinate measuring device due to vibration, with preference for measured values lying nearer to the instant of probing ($t_0$).

The correction may further comprise storing correction parameters (at 233) that additionally describe the transmission behavior of the sensors ($a_x$, $a_y$, $a_z$) and that of a signal processing device that is connected to follow the sensors.

The system of equations on which the calculation is based will be derived below from basic considerations, and in fact under the precondition that free vibrations are concerned, i.e., that the coordinate measuring device at the instant of probing either moves at a uniform velocity or is stationary. The coordinate measuring device must moreover still be in this state, which is free from forces, for a certain period of time before the instant of probing, namely during a period of time in which the signals of the acceleration sensors $a_x$, $a_y$, $a_z$ are received for evaluation in the memory (16).

Fundamentals If a linear elastic structure vibrates due to a prior arbitrary excitation, without any other external forces acting on it thereafter, and thus in motion at a constant velocity which means not accelerated this motion of a viscous damped system at a point k under the precondition that all characteristic values are complex, can be described by:

$$u_k(t) = \sum_{r=1}^{n} \{\bar{Z}_r \bar{\phi}_{kr} e^{\bar{\lambda}_r t} + \bar{Z}_r^* \bar{\phi}_{kr}^* e^{\bar{\lambda}_r^* t}\}. \quad (1)$$

Furthermore, if it is assumed that the characteristic modes are real ("hypothesis of convenience"), there can be written:

$$u_k(t) = \sum_{r=1}^{n} e^{-\delta_r t} \{X_{cr} \cos(v_r t) + X_{sr} \sin(v_r t)\} \phi_{kr} \quad (2)$$

Here the meanings are:

$\bar{\lambda}_r = -\delta_r + j v_r$ : characteristic value of the r-th mode
$\delta_r$ : decay constant of the r-th mode
$v_r$ : resonance frequency of the r-th mode
$\phi_{kr}$ : characteristic mode vector at point k of the r-th mode
$\bar{Z}_r$, $X_{cr}$, $X_{sr}$ : constants which, inter alia, contain the initial conditions of the vibration.

Explicit derivations are given for discrete systems, e.g., by H. G. Natke in his book, "Introduction into the Theory and Practice of Time Series and Modal Analysis" Vieweg Verlag, Braunschweig 1983. Equations (5.82), (5.86). That these two equations are very similar and Equation (2) represents only a special case of Equation (1) (real characteristic modes), is recognized if Equation (1) is transformed a little. There is then obtained:

$$u_k(t) = \sum_{r=1}^{n} e^{-\delta_r t}[2(Re\{\bar{Z}_r\}Re\{\bar{\phi}_{kr}\} - Im\{\bar{Z}_r\}Im\{\bar{\phi}_{kr}\})\cos(v_r t) - \quad (3)$$

$$2(Re\{\bar{Z}_r\}Im\{\bar{\phi}_{kr}\} + Im\{\bar{Z}_r\}Re\{\bar{\phi}_{kr}\})\sin(v_r t)]$$

In practice this relationship means that an observed free vibration is composed of the superposition of decay curves at the individual natural frequencies of the structure. It is moreover evident from the equations that it cannot be determined from individual decay curves whether complex or real characteristic modes are present for the structure.

In general, the parameters of natural frequencies, damping constants and characteristic modes are known; they are dependent on the model, and they can be determined for the respective structure from a theoretical calculation according to the finite element method (FEM) and/or from measurements and subsequent modal analysis. A FEM calculation provides very reliable results for the characteristic modes and the modal constants, while the natural frequencies are better obtained from modal analysis, and the damping constants are only to be determined by technical trials.

The coefficients $Z_r$ in Eq. (1), or the coefficients $x_{cr}$ and $x_{sr}$ in Eq. (2) are unknown, and can be determined by means of the initial conditions of the vibration.

A practical possibility for the determination of the coefficients is the linear fitting of Eq. (1) or Eq. (2) to an arbitrary time section of the decay curve, preferably near the instant of probing. This has the advantage that other mechanisms of excitation of vibrations (floor accelerations) are also largely considered, that is, all the forces are considered which have their action before the time interval which is used for the determination of the coefficients which depend on the initial conditions.

For the direct determination of the unknown coefficients in Eq. (1) or in Eq. (2), a path sensor is required which monitors the vibration of a point of the coordinate measuring device in relation to a stationary coordinate system. Since, however, this is not present, and acceleration sensors are used instead of it for sensing the vibration, the vibration acceleration is required; this is obtained from twice differentiating (1) as:

$$\ddot{u}_k(t) = \sum_{r=1}^{n} \{\bar{\lambda}_r^2 \bar{Z}_r \bar{\phi}_{kr} e^{\bar{\lambda}_r t} + \bar{\lambda}_r^{*2} \bar{Z}_r^* \bar{\phi}_{kr}^* e^{\bar{\lambda}_r^* t}\} \quad (4)$$

or from Eq. (2) as:

$$\ddot{u}_k(t) = \sum_{r=1}^{n} e^{-\delta_r t} \{(\delta_r^2 X_{cr} - 2 v_r \delta_r X_{sr} - v_r^2 X_{cr})\cos(v_r t) + \quad (5)$$

$$(\delta_r^2 X_{sr} + 2 v_r \delta_r X_{cr} - v_r^2 X_{sr})\sin(v_r t)\} \phi_{kr}$$

However, only now, with the equations Eq. (1) through Eq. (5), is the vibration of a point described in a stationary coordinate system.

The measurement errors originated by the vibration are however a question. Therefore it is next to be investigated, what relationship exists between the vibrations according to Eq. (1) through Eq. (5) and an expected measurement error.

Figure 7:
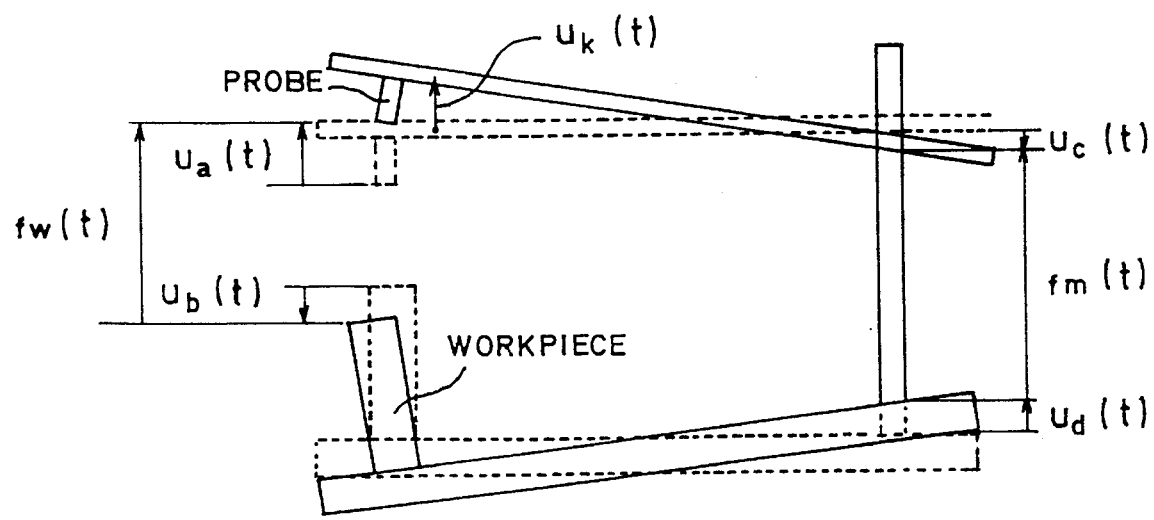
FIG. 7 is a simple sketch of principle which illustrates the vibration behavior of a coordinate measuring device of the column type.

FIG. 7 explains the fact that a large difference can exist between the motion of a point and the actual measurement error, entirely due to the vibration.

As can be seen there, essentially 2 time-dependent errors arise for a structure deformed by a vibration, namely between the workpiece and the probe a varying distance as against the undeformed structure, $f_w(t)=(u_b(t)-u_a(t))$, and on the other hand an error in the measurement system, $f_m(t)=(u_c(t)-u_d(t))$. The total error, i.e., the value which must be subtracted from the value read off on the measurement system, in order to obtain the correct measurement value without any influence of vibrations, results from the difference of these partial errors as:

$$f(t) = f_w(t) + f_m(t) = u_b(t) - u_a(t) + u_c(t) - u_d(t) \qquad (6)$$

Moreover attention must be paid to the fact that the observed path $u_k(t)$ at the location of the acceleration sensor is in general different from the path $u_a(t)$ at the probe ball.

It can often arise with column measuring devices that the motion $u_b(t)$ and $u_d(t)$ is relatively small and can therefore be ignored, especially in a beam device with a relatively large foundation.

To correct the coordinate measurement values, acceleration sensors are of course appropriately used only at one place on the equipment, so that only the one motion ($u_k(t)$ in FIG. 7) can be observed.

To convert the observed motion $u_k(t)$ to the measurement error, firstly Eq. (1) or Eq. (2) is to be considered again. The one location-dependent parameter in these equations is the characteristic mode vector $\phi_{kr}$. On the other hand, the characteristic mode vector is not time-dependent. Thus each of the motions $u_a(t)$, $u_b(t)$, $u_c(t)$ and $u_d(t)$ contributing to the total error can be written analogously to Eq. (1) or Eq. (2), where only the location-dependent characteristic mode vector changes at any given time. Thus there results, e.g., for the motion $u_a(t)$, instead of Eq. (1):

$$u_a(t) = \sum_{r=1}^{n} \{\bar{Z}_r \bar{\phi}_{ar} e^{\bar{\lambda}_r t} + \bar{Z}_r^* \bar{\phi}_{ar}^* e^{\bar{\lambda}_r^* t}\} \qquad (7)$$

In the next step, a further tensor $G_r$, a diagonal matrix for each characteristic mode r, can be introduced, and represents the relationship of the characteristic mode values, which influence the measurement errors, to the characteristic mode vector at the location of observation:

$$\bar{G}_r \bar{\phi}_{kr} = \bar{\phi}_{br} - \bar{\phi}_{ar} + \bar{\phi}_{cr} - \bar{\phi}_{dr} \qquad (8)$$

or with the requirement for real characteristic modes:

$$G_r \phi_{kr} = \phi_{br} - \phi_{ar} + \phi_{cr} - \phi_{dr} \qquad (9)$$

Thus the measurement errors can be expressed, analogously to Equation (1) or Equation (2), by:

$$f(t) = \sum_{r=1}^{n} \{\bar{Z}_r \bar{G}_r \bar{\phi}_{kr} e^{\bar{\lambda}_r t} + \bar{Z}_r^* \bar{G}_r^* \bar{\phi}_{kr}^* e^{\bar{\lambda}_r^* t}\} \qquad (10)$$

or under the requirement for real characteristic modes:

$$f(t) = \sum_{r=1}^{n} e^{-\delta_r t} \{X_{cr} \cos(v_r t) + X_{sr} \sin(v_r t)\} G_r \phi_{kr} \qquad (11)$$

Determination of the motion from the acceleration

For measurements with acceleration sensors as observers, functions corresponding to Equations (4) or (5) are sensed. Considering these equations, it can be seen that different parameters are linearly dependent on each other, if only one measurement location k is assumed ($\bar{Z}_r \bar{\phi}_{kr}$ in Eq. (4) or $x_{sr} \phi_{kr}$ and $x_{cr} \phi_{kr}$ in Eq. (5) However, this means that these parameters can only be determined in combination from a measured acceleration signal. The measured signal can be unambiguously analyzed in the following form:

$$\ddot{u}_k(t) = \sum_{r=1}^{n} e^{-\delta_r t} \{a_{kcr} \cos(v_r t) + a_{ksr} \sin(v_r t)\} \qquad (12)$$

Here the initial conditions are contained in the two real vectors $a_{kcr}$ and $a_{ksr}$.

For a comparison of coefficients, Eq. (4) is first rearranged somewhat, obtaining:

$$\ddot{u}_k(t) = \sum_{r=1}^{n} e^{-\delta_r t} [2(Re\{\bar{\lambda}_r^2\}Re\{\bar{Z}_r\bar{\phi}_{kr}\} - Im\{\bar{\lambda}_r^2\}Im\{\bar{Z}_r\bar{\phi}_{kr}\})\cos(v_r t) - 2(Re\{\bar{\lambda}_r^2\}Im\{\bar{Z}_r\bar{\phi}_{kr}\} + Im\{\bar{\lambda}_r^2\}Re\{\bar{Z}_r\bar{\phi}_{kr}\})\sin(v_r t)] \qquad (13)$$

Considering, furthermore, that:

$$Re\{\bar{\lambda}_r^2\} = \delta_r^2 - v_r^2 \qquad (14)$$

$$Im\{\bar{\lambda}_r^2\} = -2\delta_r v_r$$

the following equation system is obtained for determination of the coefficients $\bar{Z}_r \bar{\phi}_{kr}$:

$$\begin{bmatrix} \delta_r^2 - v_r^2 & 2v_r\delta_r \\ 2v_r\delta_r & v_r^2 - \delta_r^2 \end{bmatrix} \begin{bmatrix} 2Re\{\bar{Z}_r\bar{\phi}_{kr}\} \\ 2Im\{\bar{Z}_r\bar{\phi}_{kr}^T\} \end{bmatrix} = \begin{bmatrix} a_{kcr}^T \\ a_{ksr}^T \end{bmatrix} \qquad (15)$$

and hence the solution:

$$2Re\{\bar{Z}_r \bar{\phi}_{kr}^T\} = \frac{\delta_r^2 - v_r^2}{(\delta_r^2 + v_r^2)^2} a_{kcr}^T + \frac{2v_r\delta_r}{(\delta_r^2 + v_r^2)^2} a_{ksr}^T \qquad (16)$$

$$2Im\{\bar{Z}_r \bar{\phi}_{kr}^T\} = \frac{\delta_r \delta_r}{(\delta_r^2 + v_r^2)^2} a_{kcr}^T + \frac{2\delta_r^2 - v_r^2}{(\delta_r^2 + v_r^2)^2} a_{ksr}^T$$

If the expression with real characteristic modes from Eq. (5) is correspondingly used, the following equation system is obtained instead of Eq. (15):

$$\begin{bmatrix} \delta_r^2 - v_r^2 & 2v_r\delta_r \\ 2v_r\delta_r & v_r^2 - \delta_r^2 \end{bmatrix} \begin{bmatrix} X_{cr} & \phi_{kr}^T \\ -X_{sr} & \phi_{kr}^T \end{bmatrix} = \begin{bmatrix} a_{kcr}^T \\ a_{ksr}^T \end{bmatrix} \qquad (17')$$

Comparing these relations with Eq. (15), the relationship between the expression with complex characteristic modes and that with real characteristic modes is recognized:

$$2Re\{\bar{Z}_r \bar{\phi}_{kr}^T\} = X_{cr} \phi_{kr}^T \qquad (18)$$

$$2Im\{\bar{Z}_r \bar{\phi}_{kr}^T\} = -X_{sr} \phi_{kr}^T$$

This relationship can incidentally also be recognized in direct comparison of Eq. (13) with Eq. (5), with reference to Eq. (14).

Determination of the coefficients from measured acceleration values

There finally still remains, as the next task, the practical determination of the coefficients $a_{kcr}$ and $a_{ksr}$ according to Eq. (12) from a received measurement signal. Here it is first assumed that the acceleration signals at the observation location k for the respective coordinate directions are present as discrete values (freedom from aliasing is assumed) with a constant time step $\Delta t$ in a certain time region before the probing. Furthermore it must be known at what point in time the measurement value acceptance took place in relation to the collected values. This point in time can first be arbitrarily established as $t=0$, which somewhat simplifies the succeeding calculations.

A function according to Eq. (12) can then be fitted by a least squares procedure to these sensed measurement values.

This determination of the values $\ddot{u}_k(t_i) = \ddot{u}_{ki}$ is then possible very easily by means of a system of linear equations, if it is assumed that the resonance frequencies $v_r$ and the decay constants $\delta_r$ are known.

The errors, weighted with a function $g_t(t)$, at a single measurement point k are first considered on a curve according To Eq. (12):

$$g_i E_i = \sum_{r=1}^{n} [e^{-\delta_r t_i} \{a_{kcr} \cos(v_r t_i) + a_{ksr} \sin(v_r t_i)\}] + \tag{19}$$

$$c_0 + c_1 t - \ddot{u}_{ki}$$

The constants $c_0$ here describe an offset which always has to be considered when acceleration sensors are used.

The constants $c_i$ describe a linear signal component, which is superposed on the actual acceleration signal (e.g., caused by the inertia of the acceleration sensor for jerky motions).

The weight function $g_i = g(t_i)$ serves to be able to somewhat control the effect of the individual measurement values on the result. In general, exponentially decaying vibrations are present in the probing process. However, measurement values which lie further back from the point of probing thereby have a considerably greater effect on the curve fitting than do measurement values directly at the point of probing. To compensate for this effect, a weighting function is recommended of the kind $g_i = e^{\delta_i}$, where inserted for (or a greater value, in order to weight still higher, measurement values which lie closer to the instant of probing). The system of equations for the determination of the coefficients $a_{kcr}$ and $a_{ksr}$ is obtained from the partial derivatives of the error sum of squares:

$$\sum_{i=1}^{m} \frac{\partial E_i^2 g_i^2}{\partial a_{kcr}} = 0; \quad \sum_{i=1}^{m} \frac{\partial E_i^2 g_i^2}{\partial a_{ksr}} = 0; \tag{20}$$

$$\sum_{i=1}^{m} \frac{\partial E_i^2 g_i^2}{\partial c_0} = 0; \quad \sum_{i=1}^{m} \frac{\partial E_i^2 g_i^2}{\partial c_1} = 0;$$

Hence there then follows the system of equations:

$$\sum_{i=1}^{m} g_i^2 \begin{bmatrix} A_{cc11i} & A_{cs11i} & A_{cc12i} & \cdots & A_{cc1ni} & A_{cs1ni} & A_{c1i}t_i & A_{c1i} \\ A_{sc11i} & A_{ss11i} & A_{sc12i} & \cdots & A_{sc1ni} & A_{ss1ni} & A_{s1i}t_i & A_{s1i} \\ A_{cc21i} & A_{cs21i} & A_{cc22i} & \cdots & A_{cc2ni} & A_{cs2ni} & A_{c2i}t_i & A_{c2i} \\ A_{sc21i} & A_{ss21i} & A_{sc22i} & \cdots & A_{sc2ni} & A_{ss2ni} & A_{s2i}t_i & A_{s2i} \\ \cdot & \cdot & \cdot & & \cdot & \cdot & \cdot & \cdot \\ \cdot & \cdot & \cdot & & \cdot & \cdot & \cdot & \cdot \\ \cdot & \cdot & \cdot & & \cdot & \cdot & \cdot & \cdot \\ A_{ccn1i} & A_{csn1i} & A_{ccn2i} & \cdots & A_{ccnni} & A_{csnni} & A_{cni}t_i & A_{cni} \\ A_{scn1i} & A_{ssn1i} & A_{scn2i} & \cdots & A_{scnni} & A_{ssnni} & A_{sni}t_i & A_{sni} \\ A_{c1i}t_i & A_{s1i}t_i & A_{c2i}t_i & \cdots & A_{cni}t_i & A_{sni}t_i & t_i^2 & t_i \\ A_{c1i} & A_{s1i} & A_{c2i} & \cdots & A_{cni} & A_{sni} & t_i & 1 \end{bmatrix} \begin{bmatrix} a_{kc1}^T \\ a_{ks1}^T \\ a_{kc2}^T \\ a_{ks2}^T \\ \cdot \\ \cdot \\ \cdot \\ a_{kcn}^T \\ a_{ksn}^T \\ c_1^T \\ c_0^T \end{bmatrix} = \sum_{i=1}^{m} g_i^2 \begin{bmatrix} A_{c1i}\ddot{u}_{ki}^T \\ A_{s1i}\ddot{u}_{ki}^T \\ A_{c2i}\ddot{u}_{ki}^T \\ A_{s2i}\ddot{u}_{ki}^T \\ \cdot \\ \cdot \\ \cdot \\ A_{cni}\ddot{u}_{ki}^T \\ A_{sni}\ddot{u}_{ki}^T \\ \ddot{u}_{ki}^T t_i \\ \ddot{u}_{ki}^T \end{bmatrix} \tag{21}$$

The abbreviations in Eq. (21) have the following meanings:

$$\begin{aligned}
A_{ccpqi} &= e^{-(\delta_p+\delta_q)t_i} \cos(v_p t_i)\cos(v_q t_i) \\
A_{cspqi} &= e^{-(\delta_p+\delta_q)t_i} \cos(v_p t_i)\sin(v_q t_i) \\
A_{scpqi} &= e^{-(\delta_p+\delta_q)t_i} \sin(v_p t_i)\cos(v_q t_i) \\
A_{sspqi} &= e^{-(\delta_p+\delta_q)t_i} \sin(v_p t_i)\sin(v_q t_i) \\
A_{cpi} &= e^{-\delta_p t_i} \cos(v_p t_i) \\
A_{spi} &= e^{-\delta_p t_i} \sin(v_p t_i)
\end{aligned} \tag{22}$$

This system of equations is implemented in the evaluation software of the computer 19 of the coordinate measuring device.

The calculations for setting up Eq. (21) can be carried out as soon as the coordinates for probing are known to the coordinate measuring device.

After solving Eq. (21), the resulting coefficients $a_{kcr}$ and $a_{ksr}$ and the vectors of constants $c_0$ and $c_1$ can be inserted into Eq. (12), and a fitted course of acceleration $\ddot{u}_k(t)$ is obtained for each coordinate direction, corresponding to FIG. 4.

If the coefficients according to Eq. (16) are converted into the values $z_r \phi_{kr}$ or $x_{sr} \phi_{kr}$ and $x_{cr} \phi_{kr}$ according to Eq. (18), the associated course of the vibration path $u_k(t)$ according to Eq. (1) or Eq. (2) can be represented.

This vibration $u_k(t)$ at the location of the vibration observation is of course in no case to be equated to the measurement errors due to vibrations. The dynamic measurement errors are, in the contrary, calculated according to Eq. (10) or Eq. (11), as set out above; besides the natural frequencies $v_r$ and the decay constants $\delta_r$, the previously determined characteristic mode factors $G_r$ or $G_r$, which describe the behavior of the characteristic mode vectors $\phi_{kr}$ at the location of the sensors ($a_x$, $a_y$, $a_z$) and at the probe ball, also have to be considered.

The transmission behavior of the acceleration sensors ($a_x$, $a_y$, $a_z$) and of the electronics (11) (FIG. 3) for processing the sensor signals still has to be considered in the correction calculation. Their transfer functions or frequency response can likewise be determined once and for all, in that, for example, the coordinate measuring device is excited harmonically in the respective axes at different frequencies at a given location and the signals of the sensors $a_x$, $a_y$, and $a_z$ or the time courses of the acceleration signal are compared with laser measurements which reproduce the vibration path of the measuring arm. The frequency responses thus determined can be approximated by a closed function and the correction parameters from the characteristic modes, i.e., for the tensor ($G_r$), can be added as correction parameters.

Figure 6:
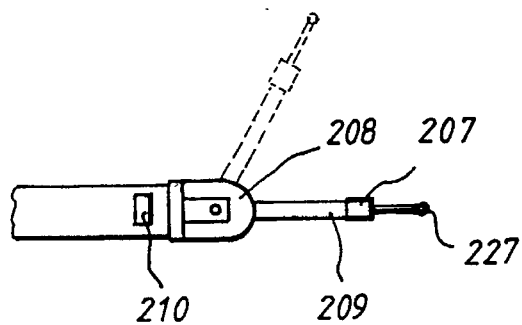
FIG. 6 is a simplified sketch which shows the front end of the measuring arm of the machine according to FIG. 1, with a so-called rotary pivoting joint set up on it.

In the consideration heretofore, the starting point was that the probe pin and the probe ball (27) on the probe head (7) were in a fixed geometrical relation to the location of the sensors ($a_x$, $a_y$, $a_z$). This assumption is however not always fulfilled. The measurement value of a coordinate measuring device is often also by means of a so-called DSE, i.e., a rotatably pivoting device is attached to the measuring arm, so that the probe element can be aligned in different spatial directions. This case is sketched in FIG. 6. The probe head (207) with the probe element (227) is attached by means of an extension piece (209) to the part, which can be aligned in two axes, of the rotary pivoting device (208). The location at which the acceleration sensors ($a_x$, $a_y$, $a_z$) are positioned is denoted by (210). Since the spatial relation between the sensors and the probe element (227) can now change, for each reference place in the measurement region of the coordinate measuring device at which the correction parameters are admitted, and for each natural frequency of the interfering vibration, three additional parameters are necessary, which are concerned with an angular position belonging to a characteristic mode.

These additional parameters describe for the 3 coordinate directions the respective behavior of the characteristic mode vectors $\phi_{kr}$ at the location of the sensors and at the location of the probe ball, i.e., recalculation factors dependent on angular position. These characteristic mode factors can either be calculated analytically from FEM models, determined by experimental technique, or empirically determined.

Figure 5:
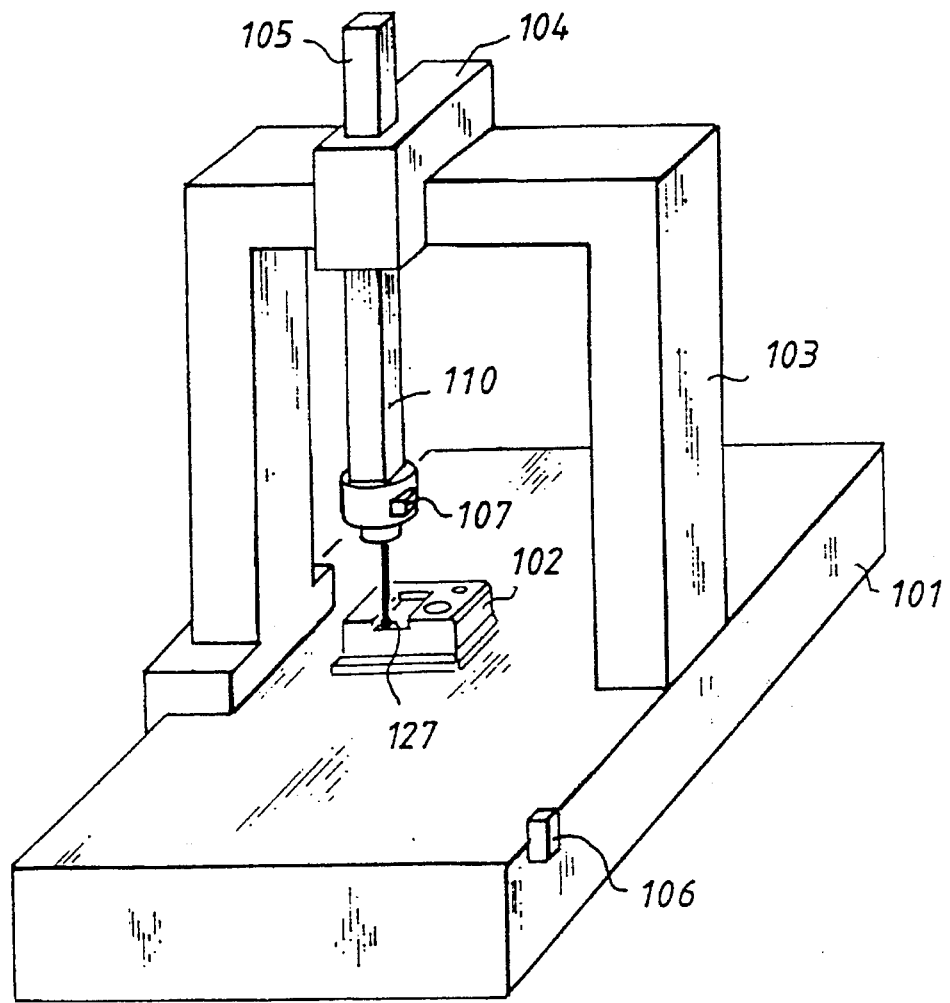
FIG. 5 is a perspective sketch showing the principle of a coordinate measuring device of the portal type, which is modified according to the invention.

Finally, the natural frequencies of the coordinate measuring device determined as correction parameters are affected by the mass of the workpiece to be measured. This effect plays a very small part for the coordinate measuring device shown in FIG. 1, since the machine base (1) there is let into the foundation of a machine shop, for example, which then represents the workpiece table, and whose mass is hardly changed by a workpiece set before the device. However, the case is different for coordinate measuring devices of, e.g., the portal type, in which the machine base simultaneously represents the workpiece table. Such a device is sketched in FIG. 5. It consists of a granite table (101), on which a portal (103) can travel horizontally. On the slide (104), which can likewise travel horizontally on the crossbeam of the portal but in the direction perpendicular to it, is mounted the vertically displaceable spindle (105) of the device. At its bottom end, this carries the probe head (107) with the probe element (127).

The vibratory behavior of this structure is affected by the mass of the workpiece (102) clamped to the table (101), and it cannot be assumed for this type of machine that the workpiece table (101) is at rest with respect to the interfering vibrations.

Nevertheless, the errors of coordinate measurement due to vibration can also be determined in this case by means of acceleration sensors, namely in that in addition to the three sensors arranged in this case at the position denoted by (110) in the probe head (107), which monitor the vibration of the spindle (105), further sensors are fitted to the measuring table (101) of the device, e.g. at the position denoted by (106). The vibrations of the workpiece table can now also be determined with these sensors on the table (101), and can be incorporated into the correction calculation. The correction parameters to be determined for these vibrations and especially the natural frequencies are however now dependent on the mass of the workpiece (102). This difficulty can be circumvented by determining several correction parameters for the natural frequencies of the table (101) for different workpiece constants and calling up the appropriate set of parameters in the measurement operation proper by inputting the actual workpiece mass.

A further effect on the quality of the correction calculation results from the time cycle in which the signals of the sensors ($a_x$, $a_y$, $a_z$) are accepted into the first in, first out memory (16) (FIG. 3). This is because the instantaneous deflection of the probe head (7) at the instant of probing is in fact required, and the instant of probing $t_0$ does not necessarily coincide with the machine cycle. Assuming a frequency of 15 Hz for the interfering vibration (which corresponds to a period of 67 ms) and a time cycle of 5 ms, the "gap" between two points of the time course of the sensor signals stored in the machine cycle corresponds to a phase angle of about 30°. An error of up to half a vibration amplitude is possible, corresponding to this uncertainty. It is therefore appropriate to determine the coordinate measurement errors due to vibration by extrapolation to the exact probing instant at which the probe element contacts the workpiece to be measured.

A possibility exists of later extrapolating the probing instant in the correction calculation carried out after the probing operation, from the probing coordinate and the measurement values, likewise read in the machine cycle, of the scales of the coordinate measuring device.

In the embodiment described, acceleration sensors were used in order to determine the amplitude of the interfering vibration at the location of the probe ball. Correspondingly, Eq. (5) is intended for the evaluation of the sensor signals, and describes the twice differentiated vibration path.

It is of course likewise possible to use, instead of acceleration sensors, those whose signals describe the vibration path directly, or describe the velocity of the vibration. In these cases the evaluation takes place using Equation (3) or the simply differentiated form of Equation (3).

We claim:

1. Method for correction of measurement errors due to vibration in a coordinate measuring device, comprising:

continuously monitoring the time course of interfering vibrations by means of sensors ($a_x$, $a_y$, $a_z$) on a vibrating portion (5) of said coordinate measuring device and storing measured values of interfering vibrations during a time interval, adjusting the measured values of said sensors with stored correction parameters that describe the natural frequency (v) an the damping constants ($\delta$) of the vibrations and also the amplitude and phase information of the characteristic modes ($G_r$) of the vibrations contributing to the interfering vibrations, and calculating the measurement errors of said coordinate measuring device due to vibration at points of probing from the time course of corrected measured values of said sensors ($a_x$, $a_y$, $a_z$).

2. Method according to claim 1, further comprising determining and storing correction parameters for different positions of a measuring slide (2/3, 4, 5) of said coordinate measuring device.

3. Method according to claim 1, further comprising storing said correction parameters as a multi-dimensional data field for reference points dependent on the position of a probe head of said coordinate measuring device in its measurement volume, and interpolating said correction parameters for coordinate measurements between said reference points from correction parameters of adjacent reference points.

4. Method according to claim 1, further comprising weighting the stored measured values of said sensors ($a_x$, $a_y$, $a_z$) differently in calculating the measurement errors of said coordinate measuring device due to vibration, with preference for measured values lying nearer to the instant of probing ($t_0$).

5. Method according to claim 1, further comprising storing correction parameters that additionally describe the transmission behavior of said sensors ($a_x$, $a_y$, $a_z$) and that of a signal processing device that is connected to follow said sensors.

6. Method according to claim 1, further comprising employing a coordinate measuring device that has a probe head (207) that is alignable in different angular positions in the measurement space of said coordinate measuring device, and storing additional correction parameters that take into account said angular positions.

7. Method according to claim 1, further comprising converting vibration values measured at the location of said sensors ($a_x$, $a_y$, $a_z$) to the location of probe elements (27, 127, 227) of the probe head of said coordinate measuring device for calculating the measurement errors, due to vibration, of the coordinate measurement.

8. Method according to claim 1, further comprising measuring all three spatial components (x, y, z) of the interfering vibrations, incorporating all three spatial components into the correction of measurement errors, and storing said correction parameters as a correction tensor ($G_r$).

9. Method according to claim 1, further comprising determining and storing said correction parameters in dependence on the mass of a workpiece (102) clamped on a table (101) of said coordinate measuring device, and selecting the set of parameters used for the correction calculation according to the workpiece mass.

10. Method according to claim 1, further comprising storing the time course of the measured values of said sensors in a rhythm derived from the machine cycle and determining the measurement errors due to vibration of the coordinate measurement by means of extrapolation to the exact instant of probing ($t_0$) at which a probe element on a probe head (7, 107) of said coordinate measuring device contacts a work piece to be measured.

11. Process according to claim 10, further comprising reading the measured values of said sensors into a first in, first out memory (16), which is read out at or shortly after the instant of probing ($t_0$).

12. Coordinate measuring device having a probe head (7, 107, 207) and a device for correction of errors, due to vibration, of the coordinate measurement, said device comprising:

at least one sensor means($a_x$, $a_y$, $a_z$) for monitoring the time course of interfering vibrations to which said probe head is subject, computer means (19) for determining from the measured values of said sensor(s) the measurement errors, due to vibration, which arise in coordinate measurements with said probe head (7, 107, 207), first memory means (20) associated with said computer means (19), in which for different positions of said probe head (7, 107, 207) in the measuring region of said coordinate measuring device correction parameters are stored that describe the natural frequency (ν) and the damping constants (δ) of the vibrations and also the amplitude and phase information of the characteristic modes ($G_r$) of vibrations contributing to the interfering vibrations, and second memory means (16) in which the time course ($\ddot{u}_k(t)$) of the measured values of said sensors are at least temporarily storable.

13. Coordinate measuring device according to claim 12, in which said sensor(s) comprise acceleration sensor(s) ($a_x$, $a_y$, $a_z$).

14. Coordinate measuring device according to claim 12, in which said sensor(s) are arranged in the immediate region of said probe head (7, 207) of said coordinate measuring device.

15. Coordinate measuring device according to claim 14, further comprising additional sensors (106) arranged on a workpiece table (101) of said coordinate measuring device to determine vibrations of said workpiece table and incorporate said vibrations into a correction calculation.

16. Coordinate measuring device according to claim 12, in which said sensor(s) are arranged in said probe head (107) of said coordinate measuring device.

17. Coordinate measuring device according to claim 16, further comprising additional sensors (106) arranged on a workpiece table (101) of said coordinate measuring device to determine vibrations of said workpiece table and incorporate said vibrations into a correction calculation.

\* \* \* \* \*